US011402290B2

(12) United States Patent
Shinoda et al.

(10) Patent No.: US 11,402,290 B2
(45) Date of Patent: Aug. 2, 2022

(54) LEAKAGE INSPECTION DEVICE, LEAKAGE INSPECTION METHOD, AND STORAGE MEDIUM

(71) Applicant: NEC CORPORATION, Tokyo (JP)

(72) Inventors: Shigeki Shinoda, Tokyo (JP); Hirofumi Inoue, Tokyo (JP); Junichiro Mataga, Tokyo (JP); Takahiro Kumura, Tokyo (JP); Katsumi Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/056,463

(22) PCT Filed: Jun. 13, 2019

(86) PCT No.: PCT/JP2019/023546
§ 371 (c)(1),
(2) Date: Nov. 18, 2020

(87) PCT Pub. No.: WO2019/240231
PCT Pub. Date: Dec. 19, 2019

(65) Prior Publication Data
US 2021/0116323 A1    Apr. 22, 2021

(30) Foreign Application Priority Data
Jun. 15, 2018 (JP) .............................. JP2018-114246

(51) Int. Cl.
*G01M 3/24* (2006.01)
*G01M 3/22* (2006.01)

(52) U.S. Cl.
CPC ................ *G01M 3/24* (2013.01); *G01M 3/22* (2013.01); *G01M 3/243* (2013.01)

(58) Field of Classification Search
CPC ................................ G01M 3/24; G01M 3/243
See application file for complete search history.

(56) References Cited

U.S. PATENT DOCUMENTS

| 2008/0314122 A1 | 12/2008 | Hunaidi et al. |
| 2012/0007744 A1 | 1/2012 | Pal et al. |
| 2016/0171965 A1* | 6/2016 | Arai .......................... G01S 5/22 381/56 |

FOREIGN PATENT DOCUMENTS

| JP | 11-201858 A | 7/1999 |
| JP | 2006-003311 A | 1/2006 |

(Continued)

OTHER PUBLICATIONS

Ono et al., WO 2015-146082, Oct. 2015, WIPO Computer Translation (Year: 2015).*

(Continued)

*Primary Examiner* — Erika J. Villaluna
(74) *Attorney, Agent, or Firm* — Sughrue Mion, PLLC

(57) ABSTRACT

A leakage inspection device according to an aspect of the present disclosure includes: at least one memory storing a set of instructions; and at least one processor configured to execute the set of instructions to: determine a measurement time; measure vibration waveforms for the measurement time by using at least two sensors set to a pipe; calculate a cross-correlation function of the measured vibration waveforms; detect peaks of the cross-correlation function at least twice in the measurement time; and determine that leakage occurs in a case where the peaks are repeatedly detected in the measurement time.

6 Claims, 16 Drawing Sheets

(56) References Cited

FOREIGN PATENT DOCUMENTS

| | | |
|---|---|---|
| JP | 2016-024023 A | 2/2016 |
| JP | 2018-044799 A | 3/2018 |
| KR | 10-2013-0064403 A | 6/2013 |
| WO | 2014/050923 A1 | 4/2014 |
| WO | 2015/146082 A1 | 10/2015 |
| WO | 2017/094846 A1 | 6/2017 |

OTHER PUBLICATIONS

Extended European Search Report for EP Application No. EP19818550.6 dated Jul. 5, 2021.
International Search Report for PCT/JP2019/023546 dated Sep. 17, 2019 [PCT/ISA/210].
Written Opinion for PCT/JP2019/023546 dated Sep. 17, 2019 [PCT/ISA/237].

* cited by examiner

LEAKAGE INSPECTION DEVICE, LEAKAGE INSPECTION METHOD, AND STORAGE MEDIUM

CROSS REFERENCE TO RELATED APPLICATIONS

This application is a National Stage of International Application No. PCT/JP2019/023546 filed Jun. 13, 2019, claiming priority based on Japanese Patent Application No. 2018-114246 filed Jun. 15, 2018, the disclosure of which is incorporated herein in its entirety by reference.

TECHNICAL FIELD

The present invention relates to a technique to inspect leakage of a pipe.

BACKGROUND ART

There is a non-drilling and non-invasive technique of inspecting leakage from voids such as holes or cracks generated in a pipe buried in the ground. For example, PTLs 1 and 2 disclose such a technique. In an example of such a technique, a leakage inspection device provides two sensors at two positions on a pipe route of the pipe or two positions of valves connected to the pipe route and detects vibration waveforms from a sound source that propagate through the pipe by the two sensors provided.

Then, the leakage inspection device calculates a cross-correlation function of the two detected vibration waveforms. The cross-correlation function is used to calculate a difference between times when the two sensors detect similar vibration waveforms. The leakage inspection device specifies a position of a sound source from the difference between the times calculated in this way.

There is a possibility that the sound source is a disturbance caused by use of water or the like, instead of the leakage. However, it is difficult to accurately determine the type of the sound source only from the vibration waveform. Therefore, the leakage inspection device according to the related art repeatedly detects the vibration waveforms by using the two sensors a plurality of times. Then, in a case where the sound source is specified at the same position in all the times of detection, it is determined that the sound source is the leakage.

CITATION LIST

Patent Literature

[PTL 1] JP 11-201858 A
[PTL 2] WO 2014/050923

SUMMARY OF INVENTION

Technical Problem

However, in the related art, in order to determine the type of the sound source, it is necessary to detect the vibration waveforms many times in different time periods and different dates. Therefore, there is a problem in that an inspection efficiency is low.

An object of the present invention is to provide a leakage inspection device or the like that can more efficiently determine whether leakage occurs.

Solution to Problem

In order to solve the above problems, a leakage inspection device according to one aspect of the present invention includes measurement time determination means for determining a measurement time, vibration measurement means for measuring vibration waveforms for the measurement time by using at least two sensors provided in a pipe, cross-correlation function calculation means for calculating a cross-correlation function of the measured vibration waveforms, peak detection means for detecting peaks of the cross-correlation function equal to or more than twice in the measurement time, and leakage determination means for determining that leakage occurs in a case where the peaks are repeatedly detected in the measurement time.

In order to solve the above problems, a leakage inspection method according to one aspect of the present invention includes determining a measurement time, measuring vibration waveforms for the measurement time by using at least two sensors provided in a pipe, calculating a cross-correlation function of the measured vibration waveforms, detecting peaks of the cross-correlation function equal to or more than twice in the measurement time, and determining that leakage occurs in a case where the peaks are repeatedly detected in the measurement time.

In order to solve the above problems, a recording medium according to one aspect of the present invention includes determining a measurement time, measuring vibration waveforms for the measurement time by using at least two sensors provided in a pipe, calculating a cross-correlation function of the measured vibration waveforms, detecting peaks of the cross-correlation function equal to or more than twice in the measurement time, and determining that leakage occurs in a case where the peaks are repeatedly detected in the measurement time.

Advantageous Effects of Invention

According to one aspect of the present invention, it is possible to more efficiently determine whether leakage occurs.

EXAMPLE EMBODIMENT

Figure 1:
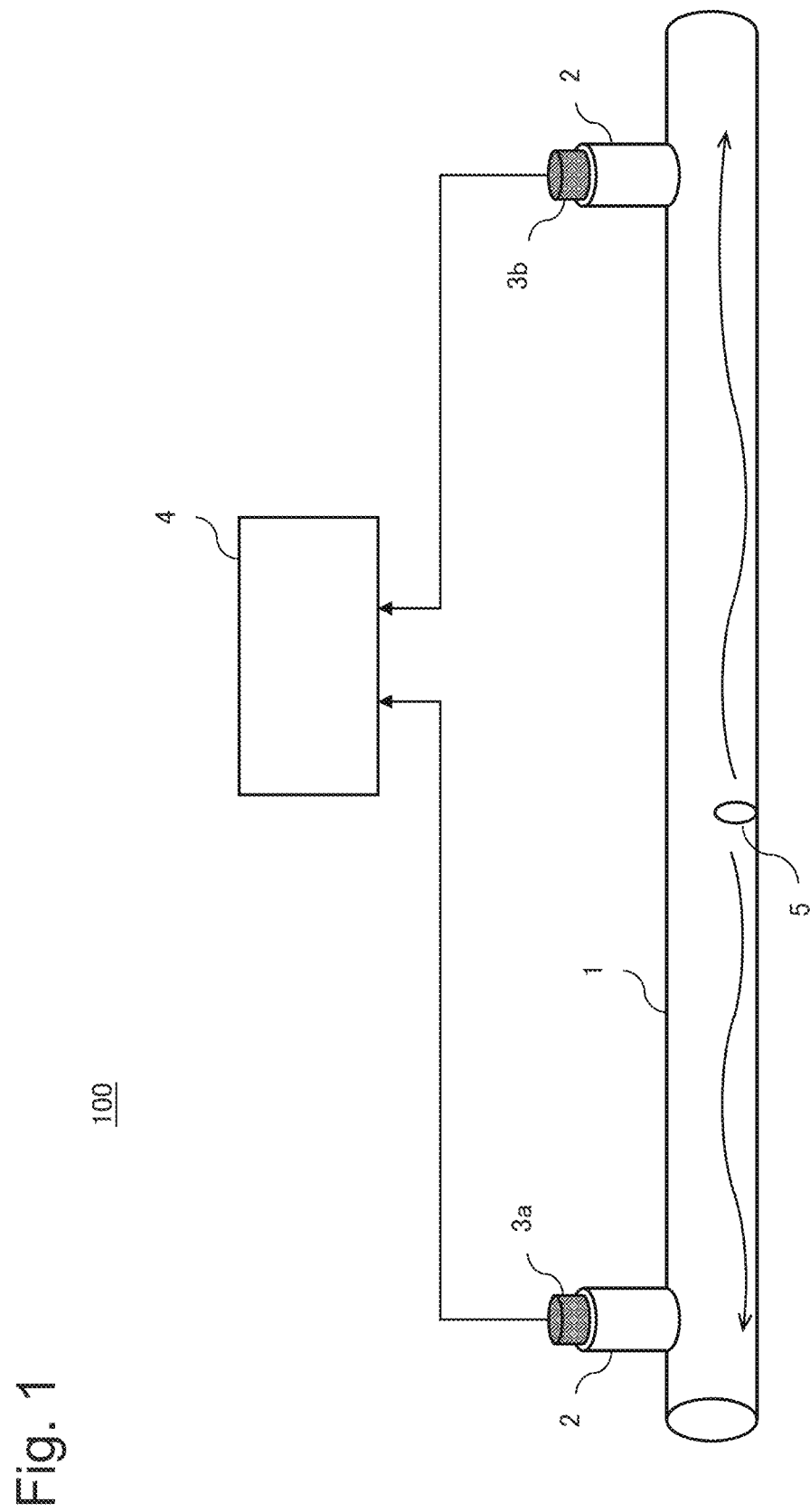
FIG. 1 is a diagram schematically illustrating a configuration of a leakage inspection system according to a first example embodiment.

Hereinafter, example embodiments of the present invention will be described with reference to the drawings. Note that, in all the drawings, similar components are denoted with the similar reference numeral, and description thereof is appropriately omitted.

First Example Embodiment (Leakage Inspection System 100)

FIG. 1 is a diagram schematically illustrating a configuration of a leakage inspection system 100 according to the present example embodiment. As illustrated in FIG. 1, the leakage inspection system 100 includes a pipe 1, valves 2, two measuring instruments 3a and 3b, and a data processor 4. The leakage inspection system 100 may include equal to or more than three measuring instruments.

The pipe 1 is used to transport a fluid such as water. The plurality of valves 2 is provided in the pipe 1. However, only two valves 2 are illustrated in FIG. 1. As illustrated in FIG. 1, the two measuring instruments 3a and 3b are provided in the valves 2. The pipe 1 may be a part of a water main or may be a water main or a drain connecting the water main to a factory, a facility, a house, or the like.

The two measuring instruments 3a and 3b are devices that measure vibration waveforms generated in the pipe 1. Data (refer to FIG. 5) of the vibration waveforms measured by the two measuring instruments 3a and 3b is transmitted to the data processor 4.

The data processor 4 determines whether leakage of the pipe 1 occurs on the basis of the data of the vibration waveforms received from the two measuring instruments 3a and 3b and displays the determination result on a display unit 20. The data processor 4 determines a type of a sound source. Specifically, the type of the sound source includes leakage and a disturbance. The disturbance includes, for example, disturbances caused by use of water. The data processor 4 is an example of a leakage inspection device.

The measuring instruments 3a and 3b and the data processor 4 may be included in the same device or may be included in different devices.

A data exchange method between the measuring instruments 3a and 3b and the data processor 4 is not limited according to wired or wireless, means such as a recording medium, or the like. The measuring instruments 3a and 3b and the data processor 4 may constantly exchange data, or after a certain amount of data is accumulated in the measuring instruments 3a and 3b, the accumulated data may be collectively transmitted to the data processor 4.

As illustrated in FIG. 1, in a case where the pipe 1 has a leakage hole 5, vibration of which a sound source is leakage from the leakage hole 5 is generated. Therefore, the vibration waveform propagates in the pipe 1. The two measuring instruments 3a and 3b measure this vibration waveform in synchronization with each other.

The measuring instruments 3a and 3b may detect the vibration waveform by any principle. For example, each of the measuring instruments 3a and 3b may include one of a vibration sensor, a water pressure sensor, and a hydrophone. It is sufficient for the measuring instruments 3a and 3b to have sensitivity at least for a frequency band of the vibration waveform that propagates in the pipe 1.

Hereinafter, a case will be described where the fluid flowing through the pipe 1 is water. However, a type of the fluid is not particularly limited. For example, the fluid may be gas, oil, or other liquid or gases.

(Data Processor 4)

Figure 2:
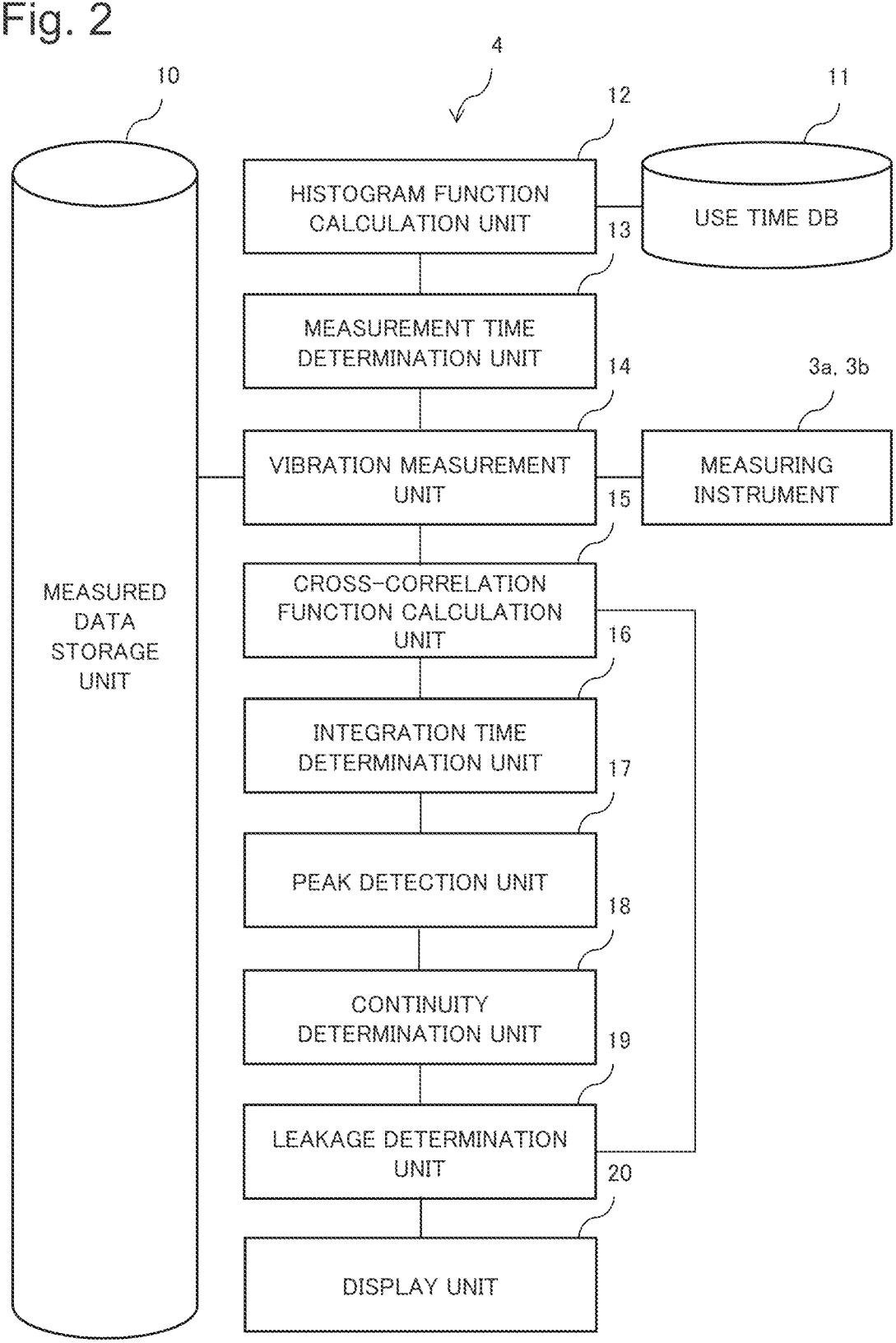
FIG. 2 is a block diagram illustrating a configuration of a data processor included in the leakage inspection system according to the first example embodiment.

FIG. 2 is a diagram illustrating a configuration of the data processor 4 included in the leakage inspection system 100. As illustrated in FIG. 2, the data processor 4 includes a measured data storage unit 10, a use time data base (DB) 11, a histogram function calculation unit 12, a measurement time determination unit 13, a vibration measurement unit 14, a cross-correlation function calculation unit 15, an integration time determination unit 16, a peak detection unit 17, a continuity determination unit 18, a leakage determination unit 19, and the display unit 20. Alternatively, the data processor 4 may include an output unit that outputs data to an external device (not illustrated), instead of the display unit 20.

The vibration measurement unit 14 stores the data of the vibration waveform measured by each of the measuring instruments 3a and 3b in the measured data storage unit 10. The measured data storage unit 10 may further store temporary processing data generated by each unit (except for measured data storage unit 10 and use time DB 11) of the data processor 4 and result information.

The use time DB 11 includes statistical data of a water use time for each time that has been recorded in advance. Here, the water use time means a time period when water continuously flows.

The histogram function calculation unit 12 acquires the statistical data of the water use time from the use time DB 11. Then, the histogram function calculation unit 12 calculates a histogram indicating a relationship between the water use time and a frequency, that is, the number of times when water is used by using the acquired data. The histogram calculation unit 12 transmits the calculated histogram to the measurement time determination unit 13.

Figure 3:
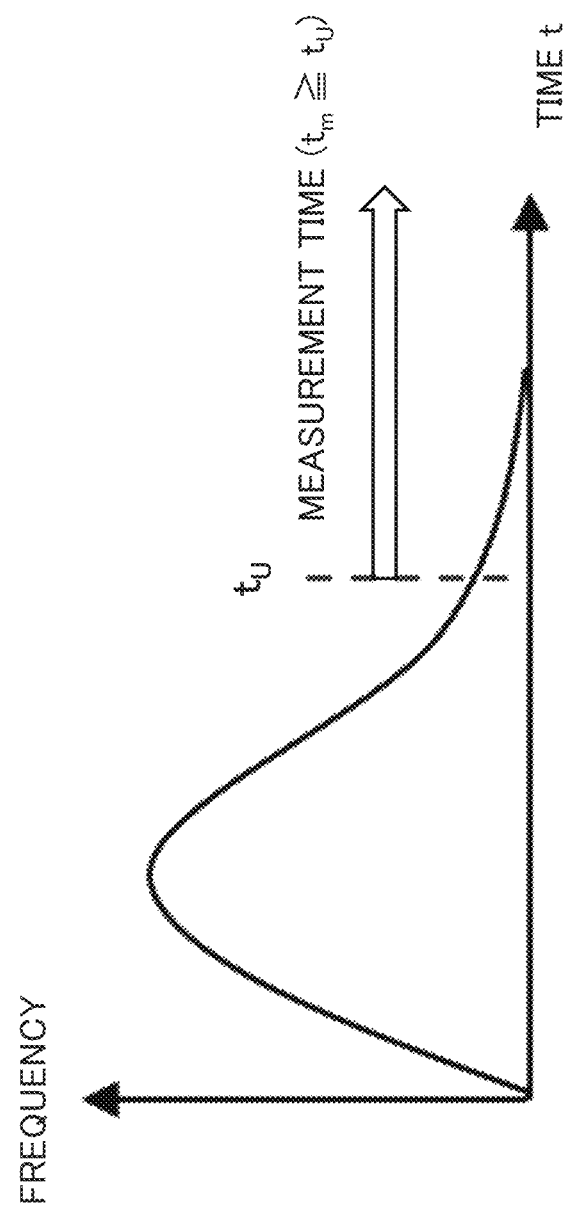
FIG. 3 is a histogram of a water use time generated by the data processor according to the first example embodiment.

FIG. 3 illustrates an example of a histogram generated by the histogram function calculation unit 12 from the statistical data that indicates the relationship between the water use time and the number of times of use. In the graph illustrated in FIG. 3, the horizontal axis represents a use time, and the vertical axis represents a frequency, that is, the number of times of use related to the water use time. As can be found from the graph illustrated in FIG. 3, if the water use time is relatively long, as the use time increases, the number of times when water is used decreases. For example, a water use time in daily life is usually several seconds to several tens seconds depending on the application, and is rarely several hours at the longest. The water use time in daily life rarely continues for one day or more.

The measurement time determination unit 13 receives the histogram from the histogram function calculation unit 12. The measurement time determination unit 13 refers to the histogram generated by the histogram function calculation unit 12 and determines a time period when a probability representing a probability that the sound source is a disturbance is equal to or less than a predetermined value determined in advance, as a measurement time. The measurement time determination unit 13 notifies the vibration measurement unit 14 of information indicating the determined measurement time.

In FIG. 3, the use time in which the probability indicating the probability that the sound source is a disturbance is equal to or less than the predetermined value determined in advance is indicated by $t_u$. The measurement time determination unit 13 determines a measurement ending time $t_m$ in such a way as to satisfy $t_m \geq t_u$. This make it possible to reduce a risk of wrong determination on the sound source, that is, it is determined that the sound source is leakage when the sound source is the disturbance and vice versa. For example, in a case where it is assumed that the histogram follow a normal distribution, the use time $t_u$ may be an average value+2σ or an average value+3σ of the histogram. In this case, because $t_m \geq t_u$ is satisfied, the measurement ending time $t_m$ is equal to or more than the average value+2σ or the average value+3σ. Here, the reference σ represents a standard deviation in a case where it is assumed that the histogram illustrated in FIG. 3 follow the normal distribution. However, a method of determining the measurement time $t_m$ is not particularly limited.

When a measurement starting time is set as a reference (zero), the measurement ending time coincides with the measurement time. Hereinafter, the measurement time is represented by a reference numeral $t_m$ as the measurement ending time.

The probability that the wrong determination on the sound source occurs is referred to as a wrong determination rate. For example, in a case where the measurement time determination unit 13 determines the minimum measurement time $t_u$ in such a way as to include a statistical water use time of 95%, the wrong determination rate of the sound source is 5%. Because a possibility that the use time is longer than the minimum measurement time $t_u$ is five %. Therefore, in a case where sound generated by the sound source continues for a measurement time longer than the minimum measurement time $t_u$, the certainty that the sound source is the leakage is 95% (=100%−5%).

Alternatively, the measurement time determination unit 13 may set a time obtained by multiplying the minimum measurement time $t_u$ by an optional safety margin coefficient s (>1) as indicated in the following formula 1 as the measurement time $t_m$. As a result, the wrong determination rate of the sound source can be further reduced.

$$t_m = s \cdot t_u \quad \text{(Formula 1)}$$

The vibration measurement unit 14 receives information indicating the measurement time from the measurement time determination unit 13. The vibration measurement unit 14 measures the vibration waveforms of the pipe 1 by using the two measuring instruments 3a and 3b. Then, the vibration measurement unit 14 accumulates data of the measured vibration waveforms in the data storage unit 10. The vibration measurement unit 14 acquires the data of the vibration waveform for the measurement time $t_m$ from the data storage unit 10 and transmits the data to the cross-correlation function calculation unit 15.

The cross-correlation function calculation unit 15 receives the data of the vibration waveforms for the measurement time $t_m$ from the vibration measurement unit 14. The cross-correlation function calculation unit 15 calculates a cross-correlation function for the measurement time $t_m$ by using the data of the vibration waveforms for the measurement time $t_m$ received from the vibration measurement unit 14. Specifically, the cross-correlation function calculation unit 15 determines a certain time period ("window time") and calculates the cross-correlation functions while sliding the window time between a start time and an end time of the measurement time $t_m$. Details of the window time will be described later.

The cross-correlation function indicates a magnitude of a correlation between the vibration waveforms measured by each of the two measuring instruments 3a and 3b. The cross-correlation function calculation unit 15 transmits information indicating the calculated cross-correlation functions for the measurement time $t_m$ to the leakage determination unit 19. As described later, the leakage determination unit 19 determines whether the sound source is in the pipe 1 on the basis of the cross-correlation functions for the measurement time $t_m$.

In a case of receiving the determination result that the sound source is in the pipe 1 from the leakage determination unit 19, the cross-correlation function calculation unit 15 transmits the information indicating the calculated cross-correlation functions for the measurement time $t_m$ to the integration time determination unit 16.

The integration time determination unit 16 receives the information indicating the cross-correlation functions for the measurement time $t_m$ from the cross-correlation function calculation unit 15. In a case where leakage occurs or water is used in the pipe 1, a peak caused by the sound source appears in the cross-correlation functions for the measurement time $t_m$. There is a case where a value of the peak of the cross-correlation function obtained by the cross-correlation function calculation unit 15 is not sufficiently large (that is, S/N is low) with respect to noise enough to clearly distinguish the peak from the noise. As a result, it is not possible for the peak detection unit 17 to be described later to detect the peak. However, if the values of the cross-correlation functions for a certain period of time are accumulated, the peak of the cross-correlation function gradually increases and becomes apparent with respect to the noise. Therefore, the integration time determination unit 16 determines a time period when the values of the cross-correlation functions are accumulated (hereinafter, may be referred to as integration time). Here, calculation of accumulating the values of the cross-correlation functions for a certain time period is referred to as integration.

Specifically, the integration time determination unit 16 first determines a minimum integration time ΔT on the basis of the following formula 2. The minimum integration time ΔT is the minimum value of the integration time. First, the integration time determination unit 16 calculates the minimum integration time ΔT according to the formula 2 described below.

$$\Delta T = \left(\frac{psr_{th}}{psr}\right)^2 \cdot T \quad \text{(Formula 2)}$$

In the formula 2, the reference psr represents the maximum value of the cross-correlation functions (hereinafter, simply referred to as maximum value) that are integrated for a measurement time T (same as $t_m$ in FIG. 3 to be described later), and the reference $psr_{th}$ represents a threshold of the cross-correlation function detected as a peak. In a case where the integrated cross-correlation functions have a peak, the maximum value psr is the value of the peak. On the other hand, in a case where the integrated cross-correlation functions do not have a peak, the maximum value psr is caused by noise. The peak threshold $psr_{th}$ is predetermined according to a S/N that is a ratio of a signal to noise from the sound source. According to the formula 2, as the maximum value psr is smaller, or as the measurement time T is longer, the minimum integration time ΔT increases. For example, in a case where the measurement time T is 30 minutes, the maximum value psr is 20, and the peak threshold $psr_{th}$ is six, the minimum integration time ΔT is 2.7 minutes according to the formula 2.

The integration time determination unit 16 determines the integration time in such a way that the integration time is longer than the minimum integration time ΔT calculated in this way and is shorter than the measurement time (hereinafter, described as $t_m$). The integration time determination unit 16 transmits information indicating the determined integration time to the peak detection unit 17 together with the information indicating the cross-correlation functions for the measurement time $t_m$.

The peak detection unit 17 receives the information indicating the integration time and the information indicating the cross-correlation functions for the measurement time $t_m$ from the integration time determination unit 16. The peak detection unit 17 repeatedly detects the peaks of the cross-correlation function in the measurement time (hereinafter, described as $t_m$). Specifically, the peak detection unit 17 detects the peaks of the cross-correlation function in the measurement time $t_m$ N (≥2) times.

For example, the peak detection unit 17 determines a time immediately after the start of the measurement time $t_m$ as a first sampling start time. The peak detection unit 17 integrates the values of the cross-correlation functions for a first integration time from the first sampling start time. Then, the peak detection unit 17 detects the maximum value that exceeds the threshold $psr_{th}$ from the integrated cross-correlation functions as a peak in the first sampling period (that is, from first sampling start time to time after first integration time).

Next, the peak detection unit 17 determines a time which is a predetermined time after the first sampling start time in the measurement time $t_m$ as a second sampling start time. For example, the predetermined time is obtained by dividing a time obtained by subtracting a time from the measurement start to the first sampling start time from the measurement time $t_m$ by N−1.

Similarly, the peak detection unit 17 integrates the values of the cross-correlation functions for a second integration time from the second sampling start time. The peak detection unit 17 detects the maximum value that exceeds the threshold $psr_{th}$ from the integrated cross-correlation functions as a peak in the second sampling period (that is, from second sampling start time to time after second integration time).

In this way, the peak detection unit 17 repeatedly executes processing of extracting the cross-correlation function for the integration time from the n-th (n=1, . . . , N) sampling start time from among the cross-correlation functions for the measurement time $t_m$ and integrating the extracted values of the cross-correlation functions for the integration time and processing of detecting the peak of the integrated cross-correlation functions N (≥2) times on the cross-correlation functions for the measurement time $t_m$.

The predetermined time may be the same as the integration time or may be shorter or longer than the integration time. That is, the predetermined time has no connection with the integration time.

The peak detection unit 17 transmits, to the continuity determination unit 18, information indicating a number of the sampling period (or sampling start time) in which the peak of the integrated cross-correlation function is detected in the measurement time $t_m$ and a number of the sampling period (or sampling start time) in which the peak cannot be detected.

The continuity determination unit 18 receives, from the peak detection unit 17, the information indicating the number of the sampling period (or sampling start time) in which the peak of the integrated cross-correlation functions is detected in the measurement time $t_m$ and the number of the sampling period (or sampling start time) in which the peak cannot be detected. On the basis of the information received from the continuity determination unit 18, the continuity determination unit 18 determines whether the peak detection unit 17 repeatedly detects the peaks in the measurement time $t_m$.

Specifically, the continuity determination unit 18 determines that the peak is disconnected in a sampling period (from sampling start time to time after integration time) in which the peak detection unit 17 is not able to detect the peak in the measurement time $t_m$. On the other hand, in a case where the peak detection unit 17 can detect the peaks in all the sampling periods in the measurement time $t_m$, the continuity determination unit 18 determines that the peaks of the cross-correlation function continue in the measurement time $t_m$. As a result, the continuity determination unit 18 determines whether the peaks of the cross-correlation function continue in the measurement time $t_m$. The continuity determination unit 18 transmits the determination result to the leakage determination unit 19.

The leakage determination unit 19 receives the information indicating the cross-correlation functions for the measurement time $t_m$ from the cross-correlation function calculation unit 15. In a case where the maximum value psr of the cross-correlation functions integrated for the measurement time $t_m$ is equal to or less than the threshold $psr_{th}$, the leakage determination unit 19 determines that the sound source does not exist in the pipe 1. On the other hand, in a case where the maximum value psr of the cross-correlation functions integrated for the measurement time $t_m$ exceeds the threshold $psr_{th}$, the leakage determination unit 19 determines that the sound source is in the pipe 1. In this case, the leakage determination unit 19 transmits the determination result indicating that the sound source exists to the cross-correlation function calculation unit 15.

The leakage determination unit 19 receives the determination result regarding whether the peaks of the cross-correlation function continue for the measurement time $t_m$ from the continuity determination unit 18. The leakage determination unit 19 determines whether the leakage occurs on the basis of the determination result regarding the continuity by the continuity determination unit 18. More specifically, in a case where the peak detection unit 17 repeatedly detects the peaks for the measurement time $t_m$, the leakage determination unit 19 determines that the sound source is the leakage. On the other hand, in a case where the peak detection unit 17 does not detect the peak at least once in the measurement time $t_m$, the leakage determination unit 19 determines that the sound source is the disturbance, that is, the sound source is not the leakage. The leakage determination unit 19 displays the determination result on the display unit 20.

(Operation Flow)

Figure 4:
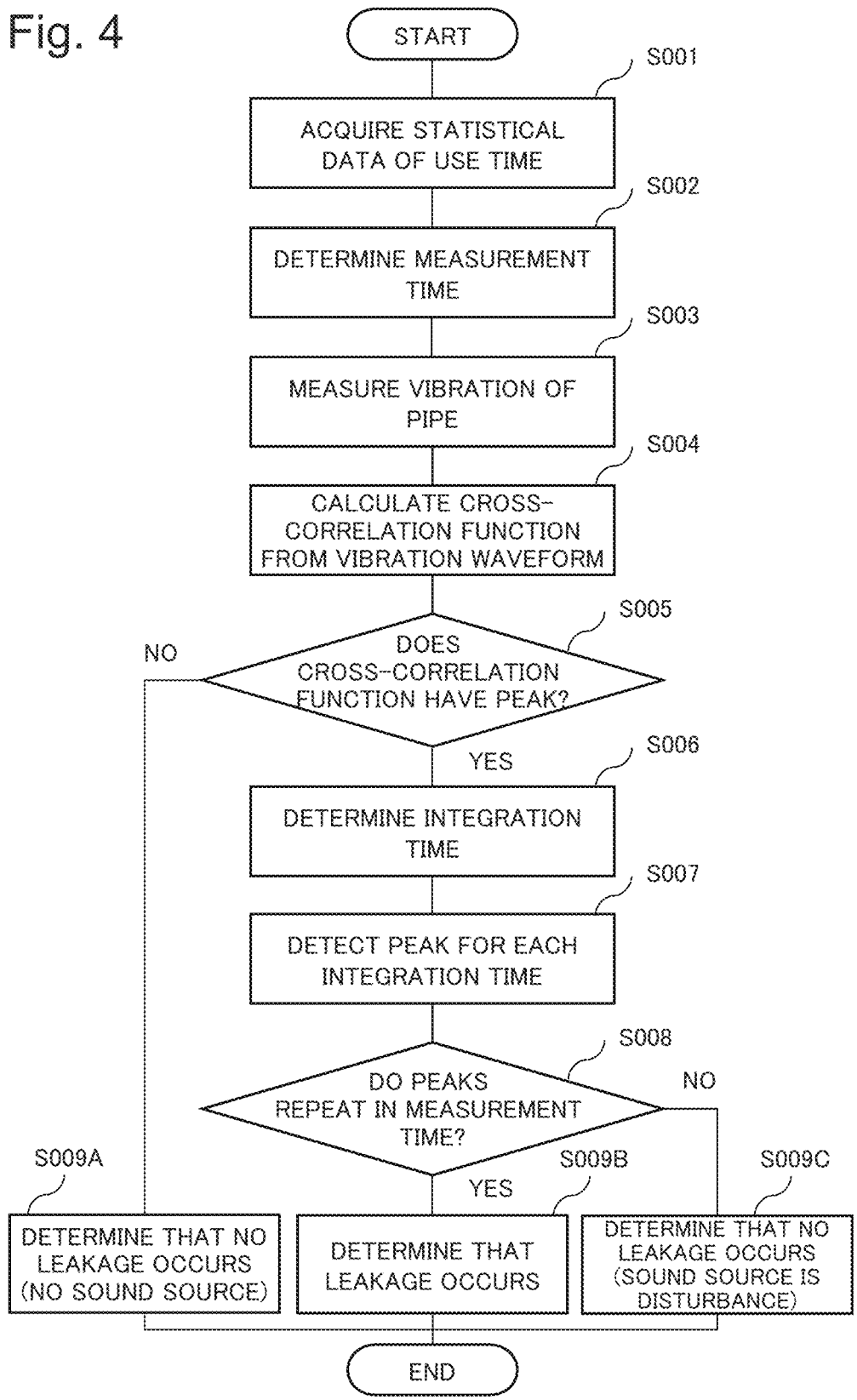
FIG. 4 is a flowchart illustrating a flow of an operation of the data processor included in the leakage inspection system according to the first example embodiment.

FIG. 4 is a flowchart illustrating an operation of the data processor 4 included in the leakage inspection system 100. As illustrated in FIG. 4, first, the histogram function calculation unit 12 generates the histogram (refer to FIG. 3) by using the statistical data of the water use time acquired from the use time DB 11 (S001).

The measurement time determination unit 13 refers to a histogram function calculated by the histogram function calculation unit 12 and determines the measurement time $t_m$ of the vibration waveform in such a way that the wrong determination rate of the sound source is equal to or less than a predetermined value determined in advance (S002). The measurement time determination unit 13 notifies the vibration measurement unit 14 of information indicating the determined measurement time $t_m$.

The vibration measurement unit 14 receives the notification of the information indicating the measurement time $t_m$ from the measurement time determination unit 13. The vibration measurement unit 14 acquires the data of the vibration waveforms for the measurement time $t_m$ measured by the two measuring instruments 3a and 3b (refer to FIG. 1) from the data storage unit 10 (S003). Thereafter, the vibration measurement unit 14 outputs the data of the vibration waveforms for the measurement time $t_m$ to the cross-correlation function calculation unit 15.

The cross-correlation function calculation unit 15 calculates the cross-correlation function by using the data received from the vibration measurement unit 14 (S004). More specifically, the cross-correlation function calculation unit 15 calculates the cross-correlation function on the basis of the data of the vibration waveforms for a certain time period (hereinafter, referred to as window time) obtained from the two measuring instruments 3a and 3b. The window time is determined, for example, on the basis of a distance between the two measuring instruments 3a and 3b. The cross-correlation function calculation unit 15 sets a time obtained by dividing the distance between the two measuring instruments 3a and 3b by a speed at which the vibration propagates through the pipe 1 as the window time.

The cross-correlation function calculation unit 15 calculates the cross-correlation functions while sliding the window time from the start time to the end time of the measurement time $t_m$. As a result, the cross-correlation functions for the measurement time $t_m$ are obtained. The cross-correlation function calculation unit 15 transmits the information indicating the cross-correlation functions for the measurement time $t_m$ to the leakage determination unit 19.

The leakage determination unit 19 receives the information indicating the cross-correlation functions for the measurement time $t_m$ from the cross-correlation function calculation unit 15. The leakage determination unit 19 integrates the cross-correlation functions for the measurement time $t_m$ and extracts the maximum value psr from the integrated cross-correlation functions. In a case where the maximum value psr does not exceed the threshold $psr_{th}$ at which the peak of the cross-correlation function can be detected, no peak exists in the cross-correlation functions in the measurement time $t_m$. In a case where the cross-correlation functions integrated for the measurement time $t_m$ do not have a peak (No in S005), the leakage determination unit 19 determines that the sound source does not exist (S009A).

On the other hand, in a case where the maximum value psr exceeds the threshold $psr_{th}$, the peak exists in the cross-correlation functions in the measurement time $t_m$. In a case where the peak exists in the cross-correlation functions (Yes in S005), the leakage determination unit 19 notifies the cross-correlation function determination unit 15 of the determination result indicating that the sound source exists. In this case, the cross-correlation function calculation unit 15 transmits the information indicating the cross-correlation functions for the measurement time $t_m$ to the integration time determination unit 16.

The integration time determination unit 16 receives the information indicating the cross-correlation functions for the measurement time $t_m$ from the cross-correlation function calculation unit 15. As described above, the integration time determination unit 16 calculates the minimum integration time $\Delta T$ and further determines an integration time longer than the minimum integration time $\Delta T$ and shorter than the measurement time $t_m$ (S006)

The peak detection unit 17 detects the peak of the cross-correlation functions integrated for the integration time at predetermined intervals in the measurement time $t_m$ (S007). In the first example embodiment, the peak detection unit 17 repeatedly executes N time processing of integrating the values of the cross-correlation functions for the integration time from the n-th (n=1, . . . , and N) sampling start time among the cross-correlation functions for the measurement time $t_m$ received from the integration time calculation unit 16 and processing of detecting the peak of the integrated cross-correlation functions.

As described above, the predetermined time may be the same as the integration time or may be longer or shorter than the integration time. In a case where the predetermined time is the same as or is longer than the integration time, a previous integration time and a next integration time do not overlap (a case of no overlap). On the other hand, in a case where the predetermined time is shorter than the integration time, the integration times partially overlap (a case with overlap).

In each of the repetitive processing from the first to the N ($\geq 2$)-th processing, the continuity determination unit 18 determines whether the peak detection unit 17 detects the peaks of the integrated cross-correlation functions. In other words, the continuity determination unit 18 determines whether the peaks of the cross-correlation function continuously exist in the measurement time $t_m$ without being disconnected (S008).

Even in a case where the peak detection unit 17 continuously detects the peaks in the measurement time $t_m$, these peaks are caused by different sound sources in a case where the positions of the peaks differ depending on the sampling period. Therefore, the continuity determination unit 18 determines whether the peak detection unit 17 repeatedly detects the peaks at the same position in the measurement time $t_m$.

In a case where the peaks of the cross-correlation function are continuously repeated in the measurement time $t_m$ (Yes in S008), the leakage determination unit 19 determines that the sound source is the leakage (S009B).

On the other hand, in a case where the peaks of the cross-correlation function do not continue in the measurement time $t_m$ (No in S008), the leakage determination unit 19 determines that the sound source is the disturbance, that is, the sound source is not the leakage (S009C). In a case where the peaks of the cross-correlation functions are intermittently repeated in the measurement time $t_m$, the leakage determination unit 19 determines that the sound source is the disturbance. That is, in a case where the peak detection unit 17 does not detect the peak at least once in the measurement time $t_m$, the leakage determination unit 19 determines that the sound source is the disturbance.

The leakage determination unit 19 displays the determination results regarding whether the leakage occurs and the type of the sound source on the display unit 20. Alternatively, in a case where the data processor 4 includes an output unit, the output unit may output the determination result by the leakage determination unit 19 to a device such as a monitor or may output the determination result as data that can be processed by a computer. The operation of the data processor 4 ends as described above.

(Cross-Correlation Function)

Figure 5:
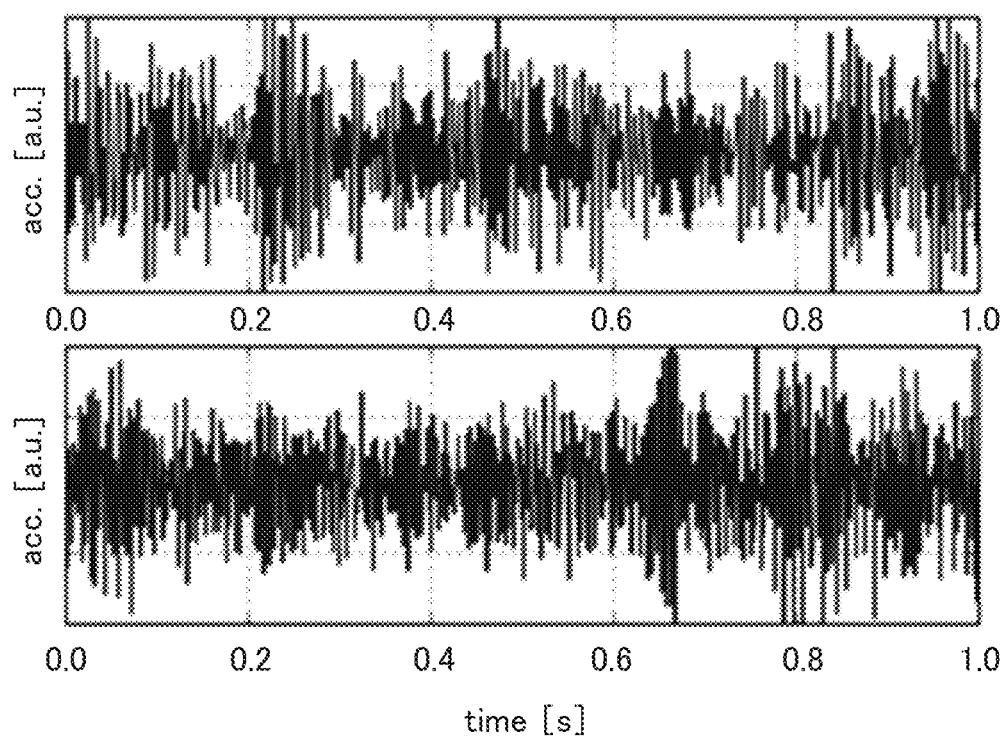
FIG. 5 illustrates an example of data of two vibration waveforms measured by two measuring instruments.

FIG. 5 is an example of data of two vibration waveforms measured by the vibration measurement unit 14 by using the measuring instruments 3a and 3b. In FIG. 5, the vertical axis of the graph indicates an acceleration (any unit may be used), and the horizontal axis indicates time (unit: [s]). In a case where at least one of a vibration waveform based on leakage or a vibration waveform based on a disturbance due to use of water or the like exists, the data of the vibration waveform illustrated in FIG. 5 indicates a characteristic correlation.

Figure 6:
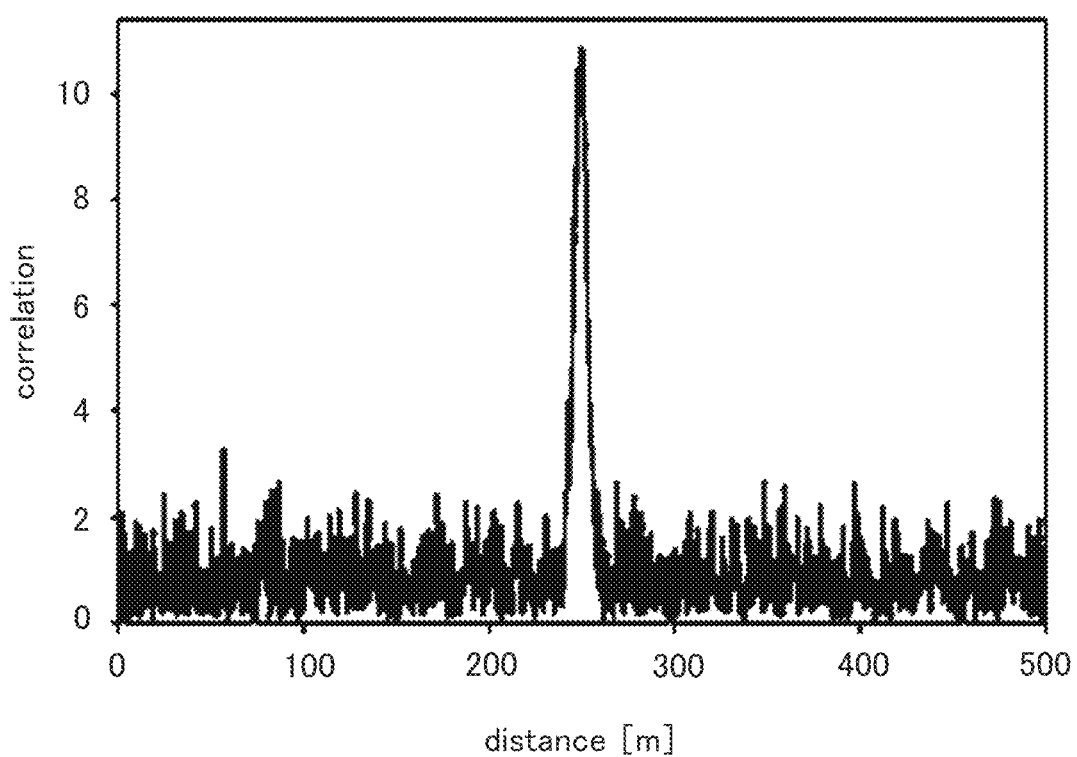
FIG. 6 illustrates an example of a cross-correlation function calculated on the basis of the data of the two vibration waveforms.

FIG. 6 illustrates a position of the sound source obtained from the cross-correlation function calculated by the cross-correlation function calculation unit 15. In FIG. 6, the vertical axis of the graph indicates a value representing a strength of a correlation between the two vibration waveforms (any unit may be used), and the horizontal axis indicates a distance from the measuring instrument 3a or 3b to the sound source (unit: [m]). In the graph illustrated in FIG. 6, the distance from the measuring instrument 3a or 3b to the sound source is obtained by converting a time difference between the same vibration waveforms in the two graphs illustrated in FIG. 5 by using the sound speed in the pipe 1. Specifically, a difference $\Delta L$ (=L1−L2) between a distance L1 from the measuring instrument 3a to the sound source and a distance L2 from the measuring instrument 3b to the sound source is obtained by (sound speed in pipe)× (time difference between same vibration waveforms). Then, when it is assumed that the distance from the measuring instrument 3a to the measuring instrument 3b be L (=L1+ L2), the distance from the measuring instrument 3a to the sound source L1=(L+$\Delta L$)/2 and the distance from the measuring instrument 3b to the sound source L2=(L−$\Delta L$)/2 are obtained.

In FIG. 6, at a distance of about 250 m from the measuring instrument 3a or 3b, the value of the cross-correlation function suddenly increases. That is, the sound source is located at a distance of about 250 m from the measuring instrument 3a or 3b. The cross-correlation function illustrated in FIG. 6 indicates a position of the sound source in a certain sampling period.

Figure 7:
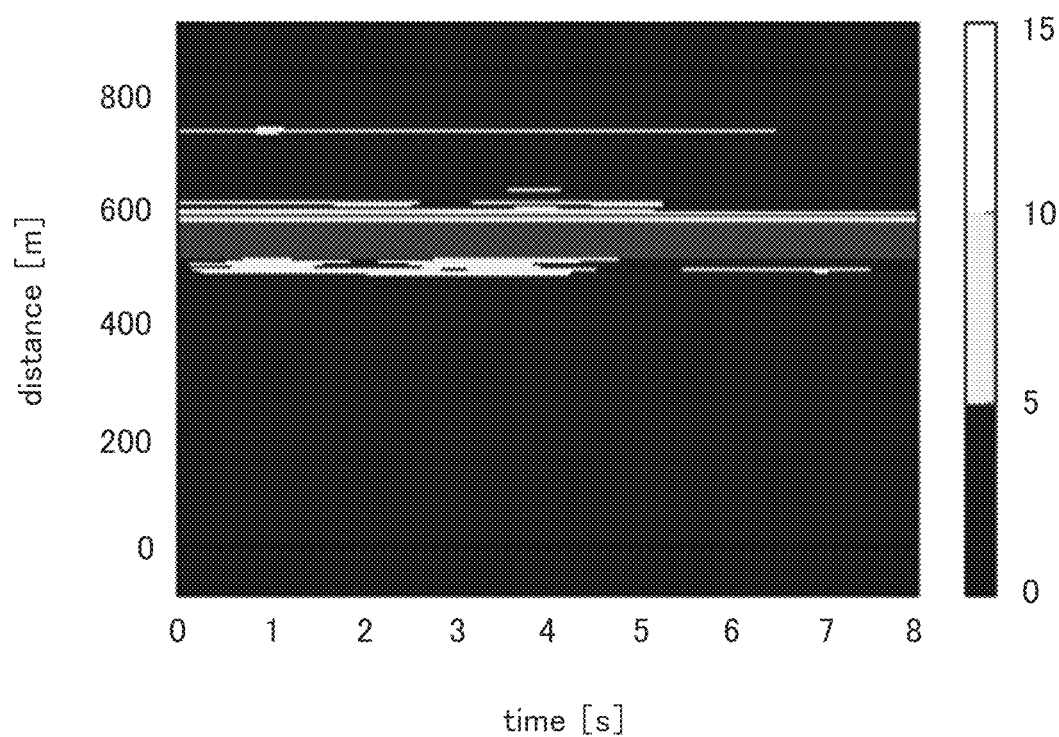
FIG. 7 is a heatmap illustrating a temporal transition of the cross-correlation function.

FIG. 7 is a heatmap illustrating a temporal transition of the cross-correlation function. In the graph illustrated in FIG. 7, the vertical axis indicates a distance (unit: [m]), and the horizontal axis indicates time (unit: [s]). In FIG. 7, the maximum value is located at a distance of about 550 m from the measuring instrument 3a or 3b. Therefore, at a distance of about 550 m from the measuring instrument 3a or 3b, the sound source caused by the leakage or the sound source caused by the disturbance exists. In order to determine whether the sound source is based on the leakage or the disturbance, it is necessary for the continuity determination unit 18 to determine whether the peaks are repeatedly detected at predetermined intervals for the measurement time $t_m$.

EXAMPLE

Figure 8:
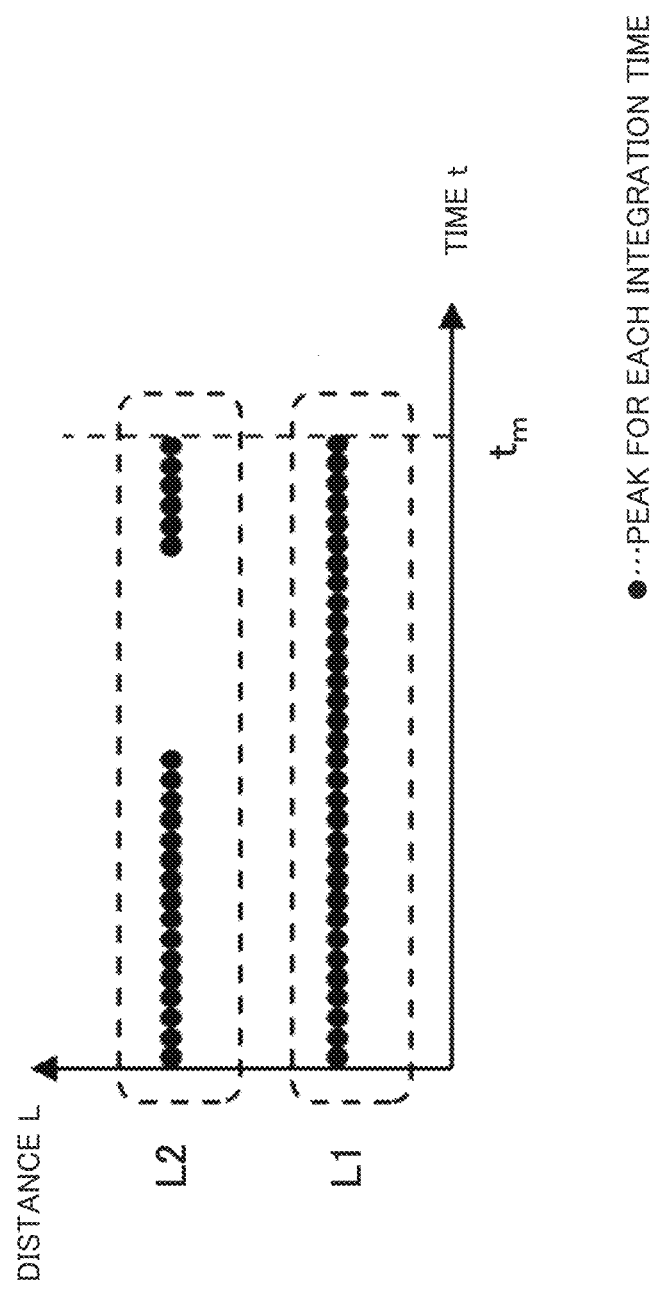
FIG. 8 is a diagram illustrating one example of a sound source type determination method.

An example of a sound source type determination method will be described with reference to FIG. 8. FIG. 8 is a graph illustrating a relationship between a distance L (vertical axis) from the measuring instrument 3a or the measuring instrument 3b to the sound source and a sampling period (horizontal axis) in which the peak of the cross-correlation function is detected. A black circle in the drawing indicates a sampling period in which the peak detection unit 17 detects the peak. At each of the positions indicated by L1 and L2, the sound source is located. Here, the sound source at the position L1 is caused by the leakage, and the sound source at the position L2 is caused by the disturbance such as use of water.

As illustrated in FIG. 8, a peak caused by the sound source at the position L1 is detected at predetermined intervals for the measurement time $t_m$. Therefore, the leakage determination unit 19 determines that the sound source is the leakage. On the other hand, the peak caused by the sound source at the position L2 is not detected in a part of the measurement time $t_m$. Therefore, the leakage determination unit 19 determines that the sound source is the disturbance caused by use of water or the like.

As in this example, in a case where both of the integration time and the measurement time are appropriate, the leakage determination unit 19 can accurately determine the sound source.

Comparative Example 1; a Case where Measurement Time is Too Short

Figure 9:
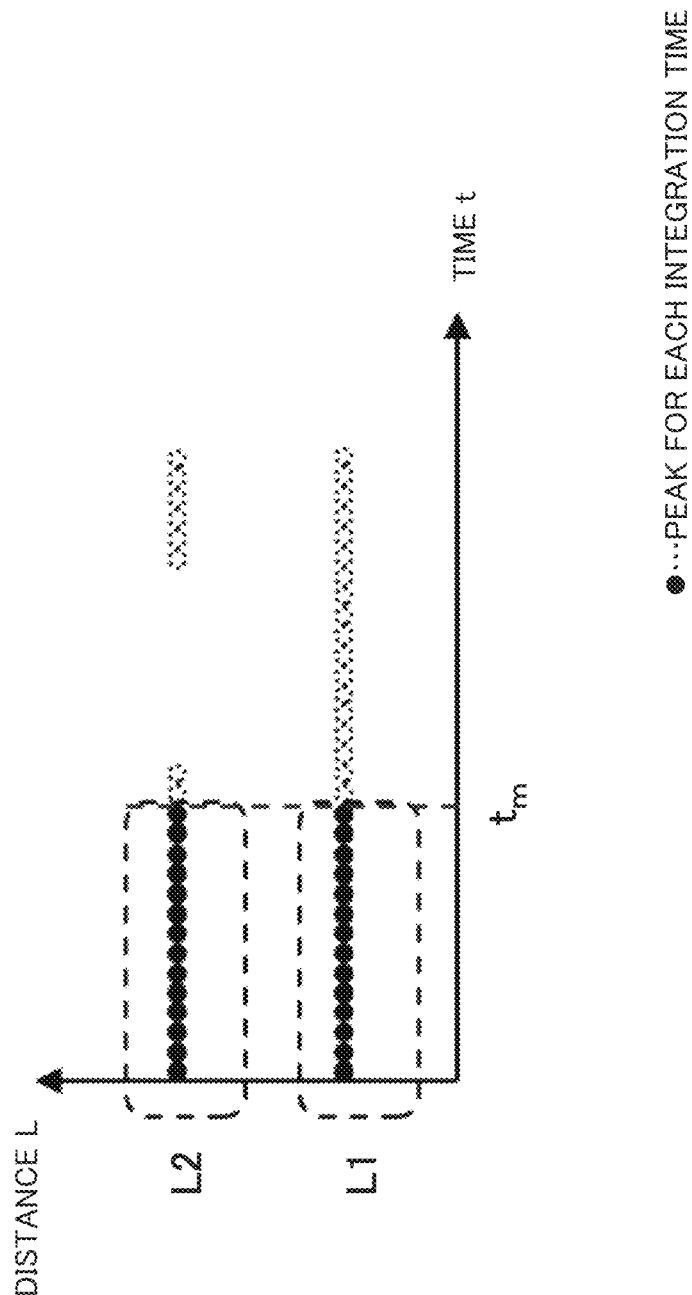
FIG. 9 is a diagram illustrating a comparative example of the sound source type determination method.

An example of a situation that may occur in a case where the measurement time $t_m$ is not appropriate will be described with reference to FIG. 9. FIG. 9 is a graph illustrating the relationship between the distance L (vertical axis) from the measuring instrument 3a or the measuring instrument 3b to the sound source and the sampling period (horizontal axis) in which the peak of the cross-correlation function is detected. Here, the sound source at the position L=L1 is caused by the leakage, and the sound source at the position L=L2 is caused by the disturbance caused by use of water.

As illustrated in FIG. 9, regarding the sound source at the position L1, the peaks are continuously detected for the measurement time $t_m$. Therefore, the leakage determination unit 19 determines that the sound source at the position L1 is the leakage. Regarding the sound source at the position L2, the peaks are continuously detected for the measurement time $t_m$. Therefore, the leakage determination unit 19 wrongly determines that the sound source at the position L2 is also the leakage. This is because the measurement time $t_m$ is too short.

With reference to FIG. 3, in a case where the measurement time $t_m$ is shorter than the minimum measurement time $t_u$, there is a possibility that the situation illustrated in FIG. 9 occurs.

In the present example embodiment, the histogram function calculation unit 12 calculates the histogram function (refer to FIG. 3) from the statistical data of the water use time. Then, the minimum measurement time $t_u$ is calculated in such a way that the probability indicating the probability that the sound source is the disturbance caused by use of water is equal to or less than the predetermined value determined in advance. The measurement time $t_m$ is determined to be longer than the minimum measurement time $t_L$. Therefore, because a possibility that the leakage determination unit 19 wrongly determines the disturbance as leakage, it is possible to correctly determine the type of the sound source.

Comparative Example 2; a Case where Integration Time is Too Short

Figure 10:
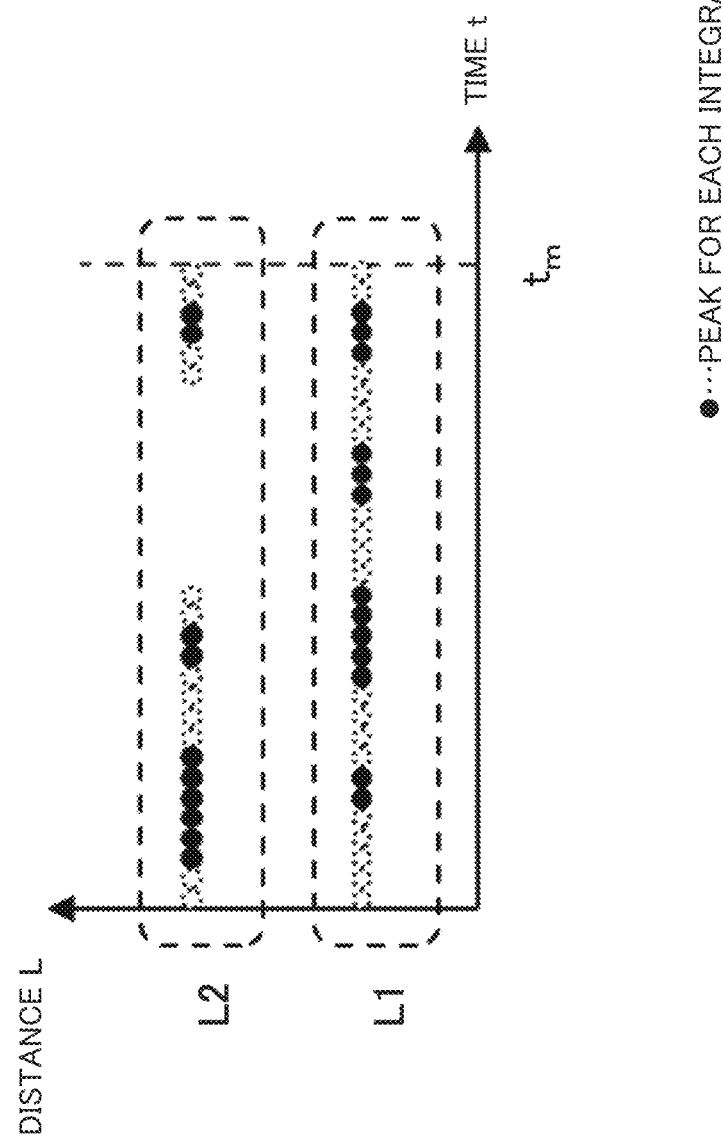
FIG. 10 is a diagram illustrating another comparative example of the sound source type determination method.

An example of a situation that may occur in a case where the integration time is not appropriate will be described with reference to FIG. 10. FIG. 10 is a graph illustrating the relationship between the distance L (vertical axis) from the measuring instrument 3a or the measuring instrument 3b to the sound source and the sampling period (horizontal axis) in which the peak of the cross-correlation function is detected. Here, the sound source at the position L=L1 is caused by the leakage, and the sound source at the position L=L2 is caused by the disturbance caused by use of water.

As illustrated in FIG. 10, regarding the sound source at the position L1, the peak is not detected in a part of the period of the measurement time $t_m$. Therefore, the leakage determination unit 19 wrongly determines that the sound source is the disturbance. This is because the integration time is too short.

In data generated by the measuring instruments 3a and 3b, the vibration waveform (signals) from the sound source and noise are superimposed. In a case where the integration time is too short, there is a possibility that the peak detection unit 17 is not able to correctly detect the peak of the cross-correlation function because the signal is buried in the noise. Specifically, in a case where the integration time is shorter than the minimum integration time $\Delta T$ described above, the peak detection unit 17 is not able to correctly detect the peak of the cross-correlation function, and as a result, there is a possibility that the situation illustrated in FIG. 10 occurs.

In the present example embodiment, the threshold $psr_{th}$ described above is determined on the basis of a S/N ratio in such a way that the vibration waveform (signals) is not buried in the noise. The minimum integration time $\Delta T$ is calculated on the basis of the formula 2 described above. If the integration time is equal to or longer than the minimum integration time $\Delta T$, because the signal is not buried in the noise, the peak detection unit 17 can correctly detect the peak of the cross-correlation function. Therefore, the possibility that the leakage determination unit 19 wrongly determines the leakage as a disturbance is low.

Effects of Present Example Embodiment

According to the configuration of the present example embodiment, if the measurement time and the integration time are appropriate, the peak of the cross-correlation function can be correctly detected. Then, on the basis whether the peaks of the cross-correlation function are repeated in the measurement time, the type of the sound source is determined. Therefore, even the measurement is performed once, whether the leakage occurs can be efficiently determined.

Second Example Embodiment

In the above example embodiment, the configuration has been described in which the measurement time is determined on the basis of the histogram of the water use time. In the present example embodiment, a configuration of determining the measurement time from the viewpoint of economic efficiency will be described. A configuration of a leakage inspection system according to the present example embodiment is the same as that of the leakage inspection system 100 (refer to FIG. 1) according to the first example embodiment.

(Data Processor 4a)

Figure 11:
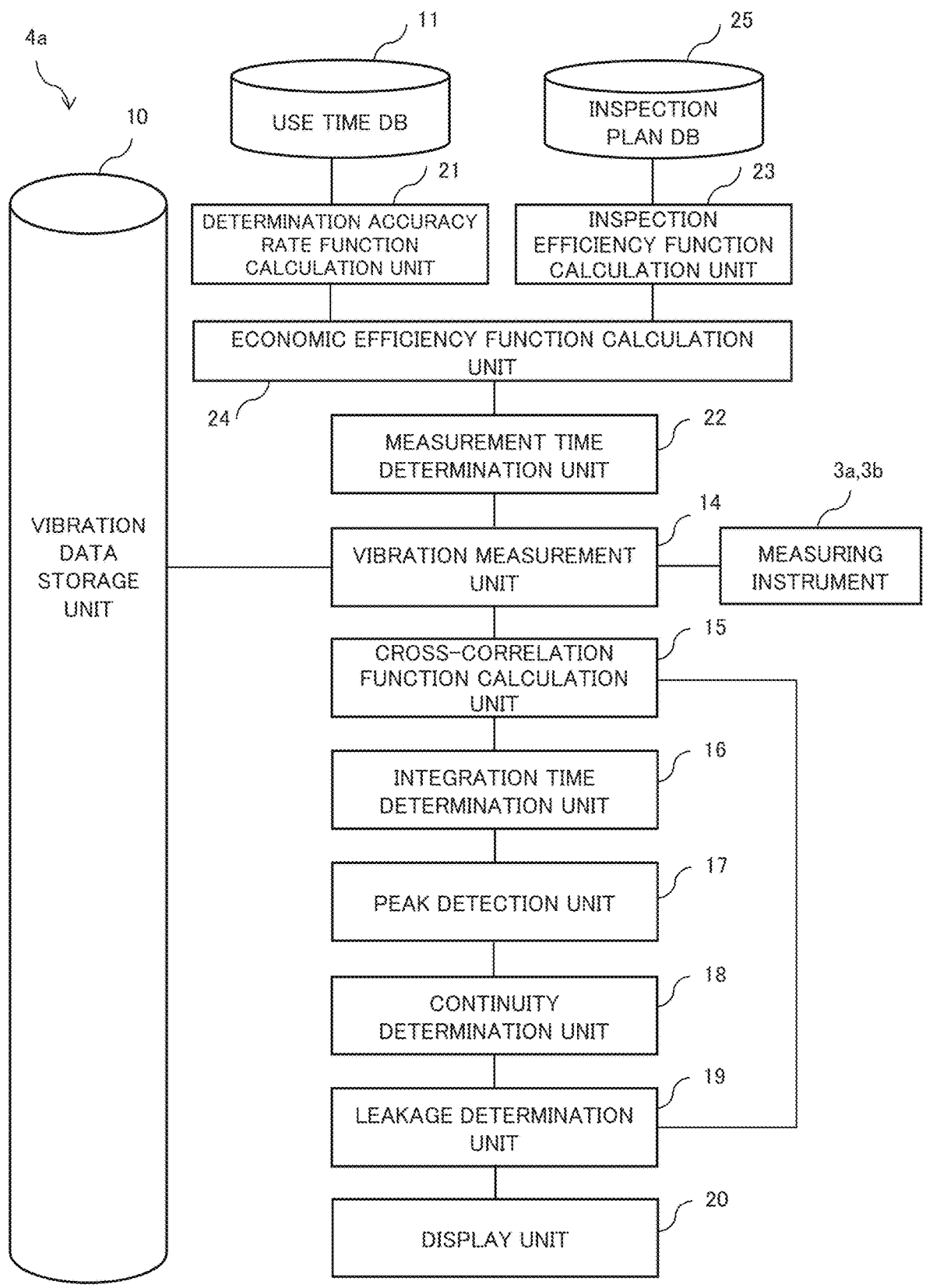
FIG. 11 is a block diagram illustrating a configuration of a data processor according to a second example embodiment.

FIG. 11 is a block diagram illustrating a configuration of a data processor 4a included in the leakage inspection system according to the present example embodiment. As illustrated in FIG. 11, the data processor 4a according to the present example embodiment includes, instead of the measurement time determination unit 13 included in the data processor 4 according to the first example embodiment, a determination accuracy rate function calculation unit 21, a measurement time determination unit 22, an inspection efficiency function calculation unit 23, an economic efficiency function calculation unit 24, and an inspection plan database (DB) 25. Other components of the data processor 4a are the same as those of the data processor 4 according to the first example embodiment. The data processor 4a is an example of a leakage inspection device.

(Determination Accuracy Rate and Inspection Efficiency)

Figure 12:
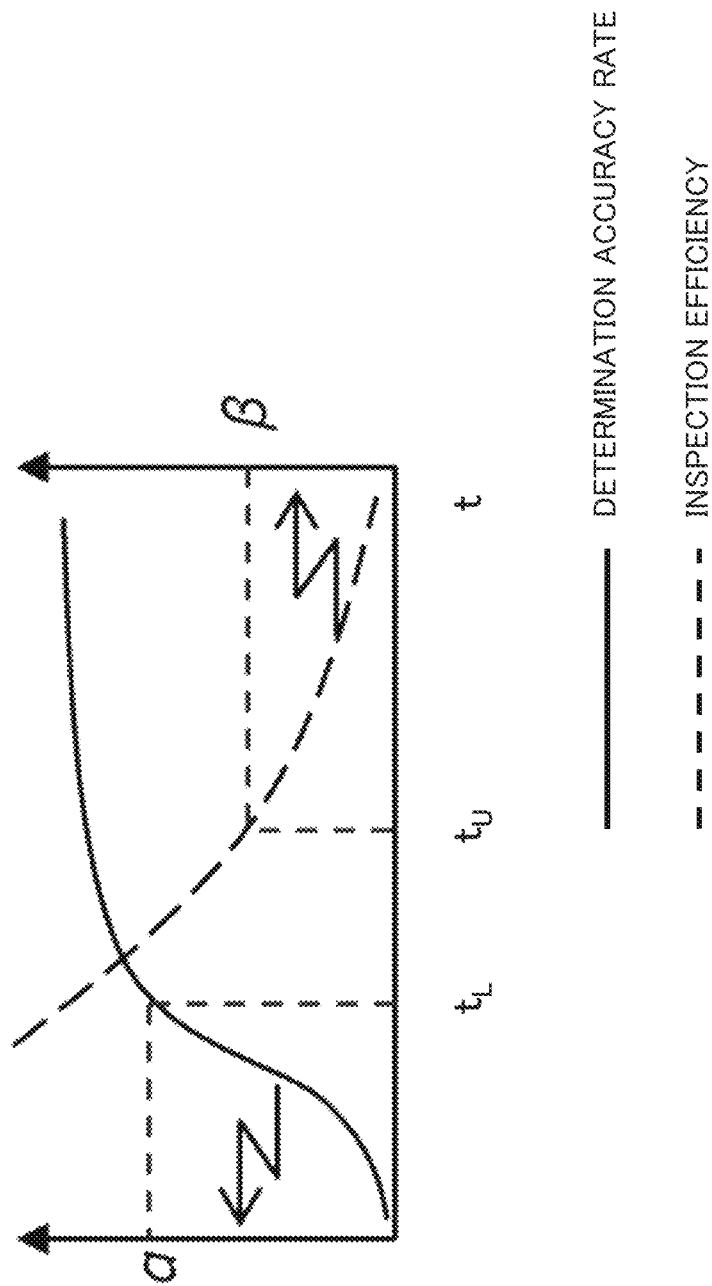
FIG. 12 is a graph illustrating an example of a determination accuracy rate function and an inspection efficiency function calculated by the data processor according to the second example embodiment.

A determination accuracy rate and an inspection efficiency will be described with reference to FIG. 12. FIG. 12 illustrates a graph illustrating a function of a determination accuracy rate with respect to time and a graph illustrating a function of an inspection efficiency with respect to time. As described in the first example embodiment, the determination accuracy rate indicates a probability that the data processor 4a can correctly determine a type of a sound source.

The determination accuracy rate function calculation unit 21 acquires statistical data of a water use time from a use time DB 11. Then, the determination accuracy rate function calculation unit 21 calculates a determination accuracy rate function indicating a height of the determination accuracy rate with respect to time by using the data acquired from the use time DB 11. As illustrated in FIG. 12, the determination accuracy rate increases with time.

The measurement time determination unit 22 determines a measurement lower limit time $t_L$ by using the determination accuracy rate function calculated by the determination accuracy rate function calculation unit 21. Specifically, the measurement time determination unit 22 determines the measurement lower limit time $t_L$ in such a way that the determination accuracy rate exceeds a first predetermined value α. The first predetermined value α may be determined, for example, by a user.

The inspection efficiency function calculation unit 23 acquires information indicating a leakage inspection plan from the inspection plan DB 25. For example, the information indicating the leakage inspection plan includes information indicating each of a total length L (km) of a pipe 1, an inspection plan period Y (year), and the number of measurement days per year D (day/year). In this case, the inspection efficiency is calculated as L/Y/D (km/day). As illustrated in FIG. 12, the inspection efficiency decreases as the time, that is, the number of measurement days increases.

The measurement time determination unit 22 determines a measurement upper limit time $t_U$ by using the inspection efficiency function calculated by the inspection efficiency function calculation unit 23. Specifically, the measurement time determination unit 22 determines the measurement upper limit time $t_U$ in such a way that the inspection efficiency does not fall below a second predetermined value β. The second predetermined value β may also be determined, for example, by a user.

As can be seen from FIG. 12, as a measurement time $t_m$ is lengthened in order to increase the determination accuracy rate, the inspection efficiency decreases. On the other hand, as the measurement time $t_m$ is shortened in order to increase the inspection efficiency, the determination accuracy rate decreases. That is, the determination accuracy rate and the inspection efficiency have a trade-off relationship. It is sufficient that the measurement time $t_m$ satisfy a relationship of $t_L \le t_m \le t_U$. In the present example embodiment, the measurement time determination unit 22 determines the measurement time $t_m$ from the viewpoint of maximizing the economic efficiency as described later.

(Economic Efficiency)

The economic efficiency function calculation unit 24 calculates an economic efficiency function by using the determination accuracy rate function and the inspection efficiency function. For example, the economic efficiency function calculation unit 24 may calculate the economic efficiency function illustrated in FIG. 13 by weighting and adding the determination accuracy rate function and the inspection efficiency function illustrated in FIG. 12.

Figure 13:
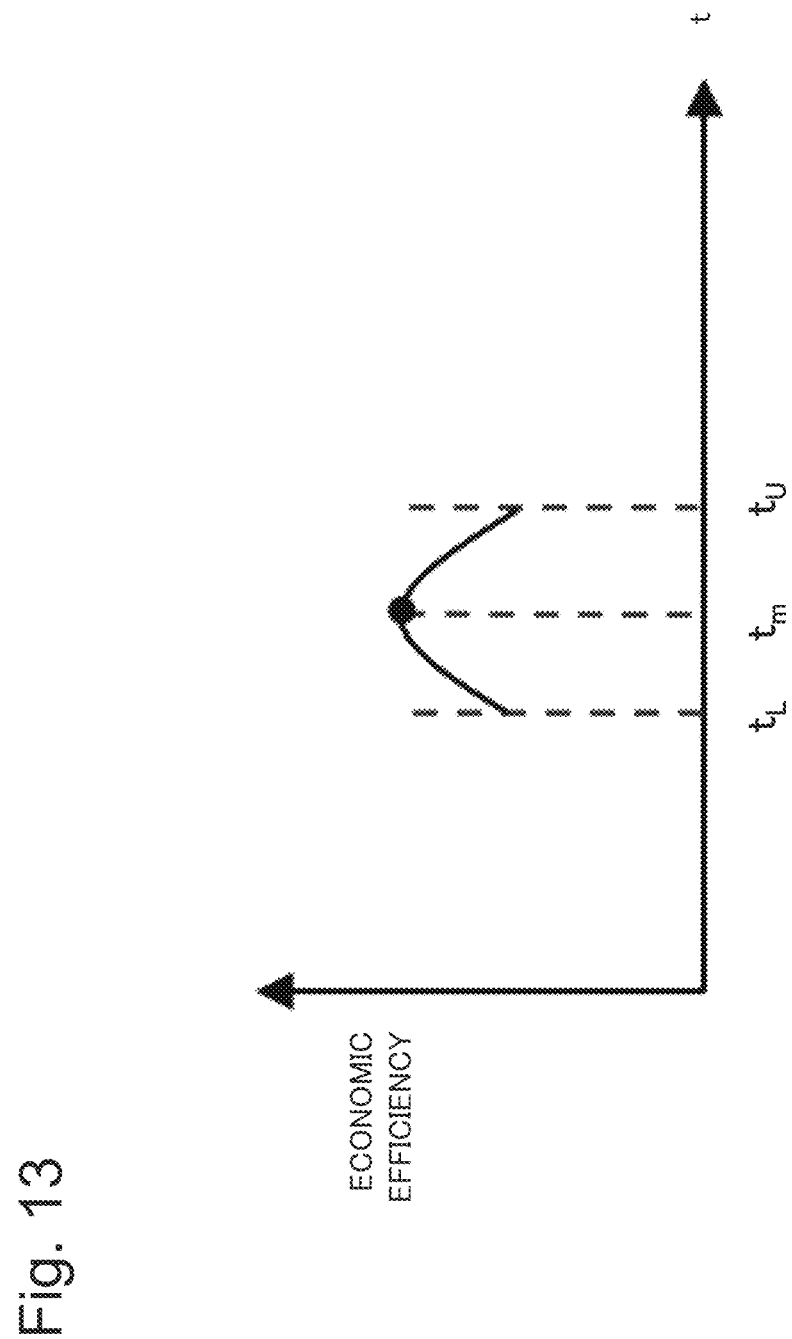
FIG. 13 is a graph illustrating an example of an economic efficiency function calculated by the data processor according to the second example embodiment.

FIG. 13 illustrates an example of the economic efficiency function calculated by the economic efficiency function calculation unit 24. As illustrated in FIG. 13, the economic efficiency function has a local maximum value, which is larger than a value at a time $t_L$ and a value at a time $t_U$, between the time $t_L$ and the time $t_U$. As described above, this is because, while the determination accuracy rate monotonically increases with time, the inspection efficiency monotonically decreases with time.

(Operation Flow)

Figure 14:
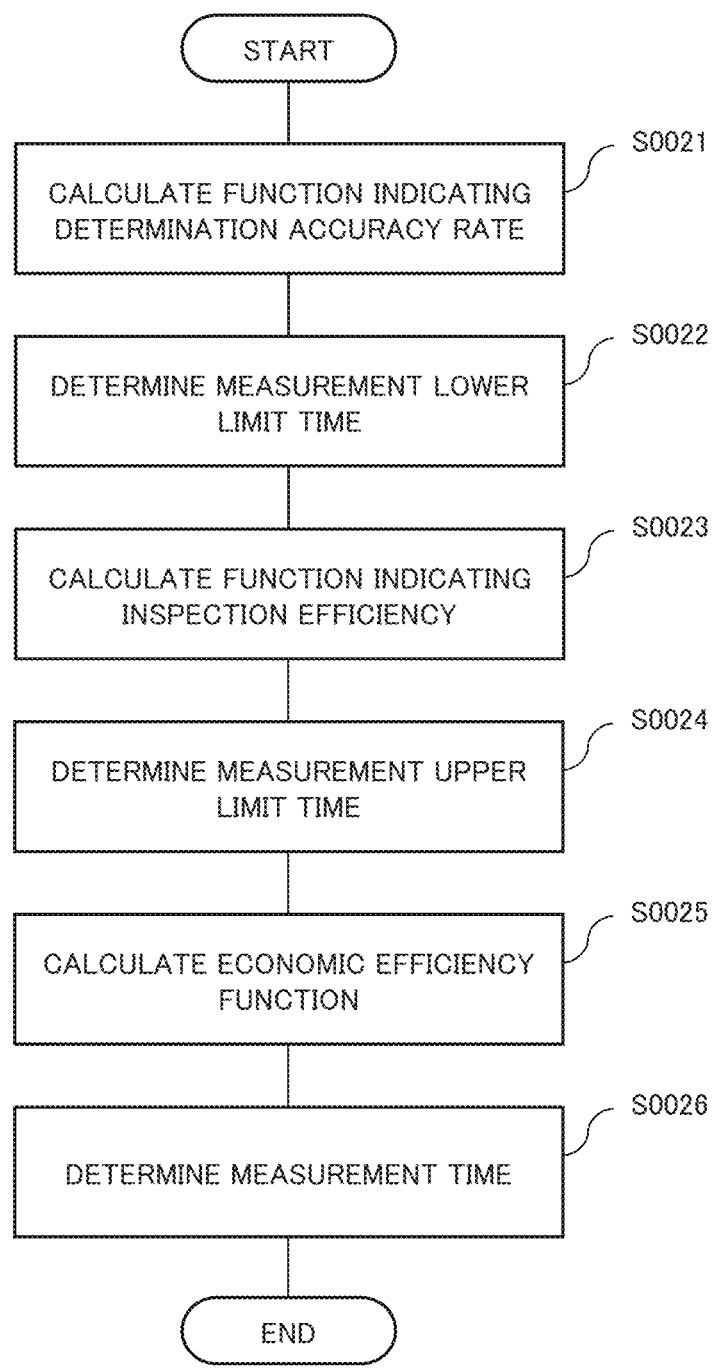
FIG. 14 is a flowchart illustrating a flow of an operation of the data processor according to the second example embodiment.

An operation of the data processor 4a according to the present example embodiment will be described with reference to FIG. 14. FIG. 14 is a flowchart illustrating a flow of the operation of the data processor 4a. In the present example embodiment, only processing related to the determination accuracy rate function calculation unit 21, the measurement time determination unit 22, and the inspection efficiency function calculation unit 23 will be described. Processing executed by other components of the data processor 4a is the same as the processing described in the first example embodiment (refer to FIG. 4).

As illustrated in FIG. 14, the determination accuracy rate function calculation unit 21 acquires the statistical data of the water use time from the use time DB 11. Then, the determination accuracy rate function calculation unit 21 calculates the determination accuracy rate function indicating the probability that the type of the sound source can be correctly determined by using the data acquired from the use time DB 11 (S0021).

The measurement time determination unit 22 refers to the determination accuracy rate function and determines the measurement lower limit time $t_L$ in such a way that the determination accuracy rate is equal to or more than a predetermined value (S0022).

The inspection efficiency function calculation unit 23 refers to the inspection plan DB 25 and calculates the inspection efficiency function indicating the inspection efficiency of the leakage inspection (S0023).

The measurement time determination unit 22 refers to the determination accuracy rate function and determines the measurement upper limit time to in such a way that the inspection efficiency is equal to or more than a predetermined value (S0024).

The economic efficiency function calculation unit 24 calculates the economic efficiency function from the determination accuracy rate function and the leakage inspection efficiency function (S0025).

The measurement time determination unit 22 refers to the economic efficiency function and determines the measurement time $t_m$ (FIG. 13) in such a way that the economic efficiency is maximized between the measurement lower limit time $t_L$ and the measurement upper limit time to (S0026).

Effects of Present Example Embodiment

According to the configuration of the present example embodiment, the economic efficiency function is calculated from the determination accuracy rate function and the inspection efficiency function. Then, the measurement time is determined in such a way as to maximize the economic efficiency. Therefore, it is possible to more efficiency determine whether leakage occurs from the viewpoint of the economic efficiency.

Third Example Embodiment (Leakage Inspection Device 4b)

Figure 15:
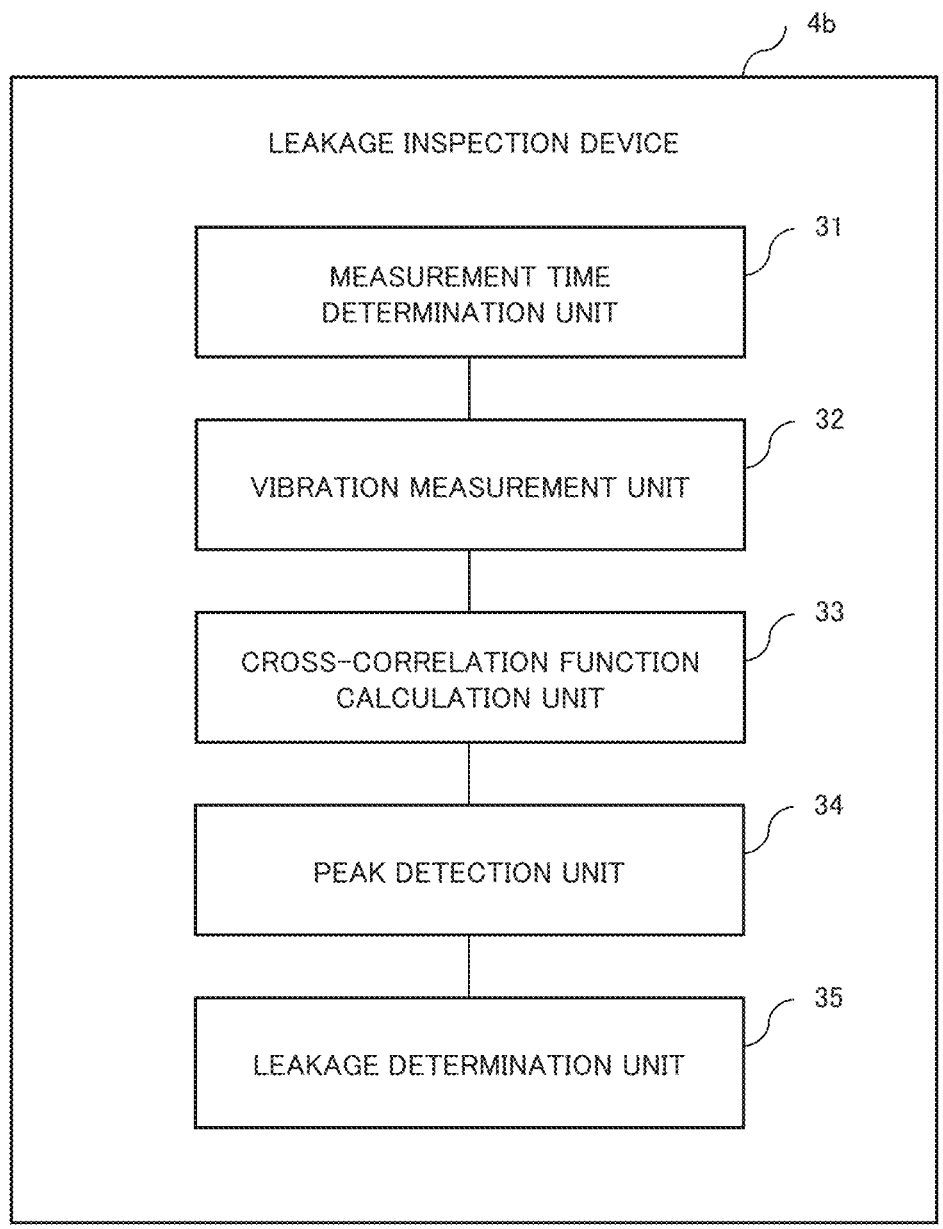
FIG. 15 is a block diagram illustrating a configuration of a leakage inspection device according to a third example embodiment.

FIG. 15 is a block diagram illustrating a configuration of a leakage inspection device 4b according to the present example embodiment. As illustrated in FIG. 15, the leakage inspection device 4b includes a measurement time determination unit 31, a vibration measurement unit 32, a cross-correlation function calculation unit 33, a peak detection unit 34, and a leakage determination unit 35.

The measurement time determination unit 31 determines a measurement time.

The vibration measurement unit 32 measures vibration waveforms for the measurement time by using at least two sensors provided in a pipe.

The cross-correlation function calculation unit 33 calculates a cross-correlation function of the measured vibration waveforms.

The peak detection unit 34 detects a peak of the cross-correlation function for each integration time shorter than the measurement time.

In a case where the peak is detected for each integration time in the measurement time, the leakage determination unit 35 determines that leakage occurs.

Effects of Present Example Embodiment

According to the configuration of the present example embodiment, the vibration waveforms are measured for the measurement time by using at least two sensors provided in the pipe. The peak of the cross-correlation function of the measured vibration waveforms is detected. In a case where the peaks of the cross-correlation function are repeated in the measurement time, it is determined that the leakage occurs. Therefore, it is possible to efficiently determine whether the leakage occurs by performing measurement only once.

Fourth Example Embodiment (Regarding Hardware Configuration)

Figure 16:
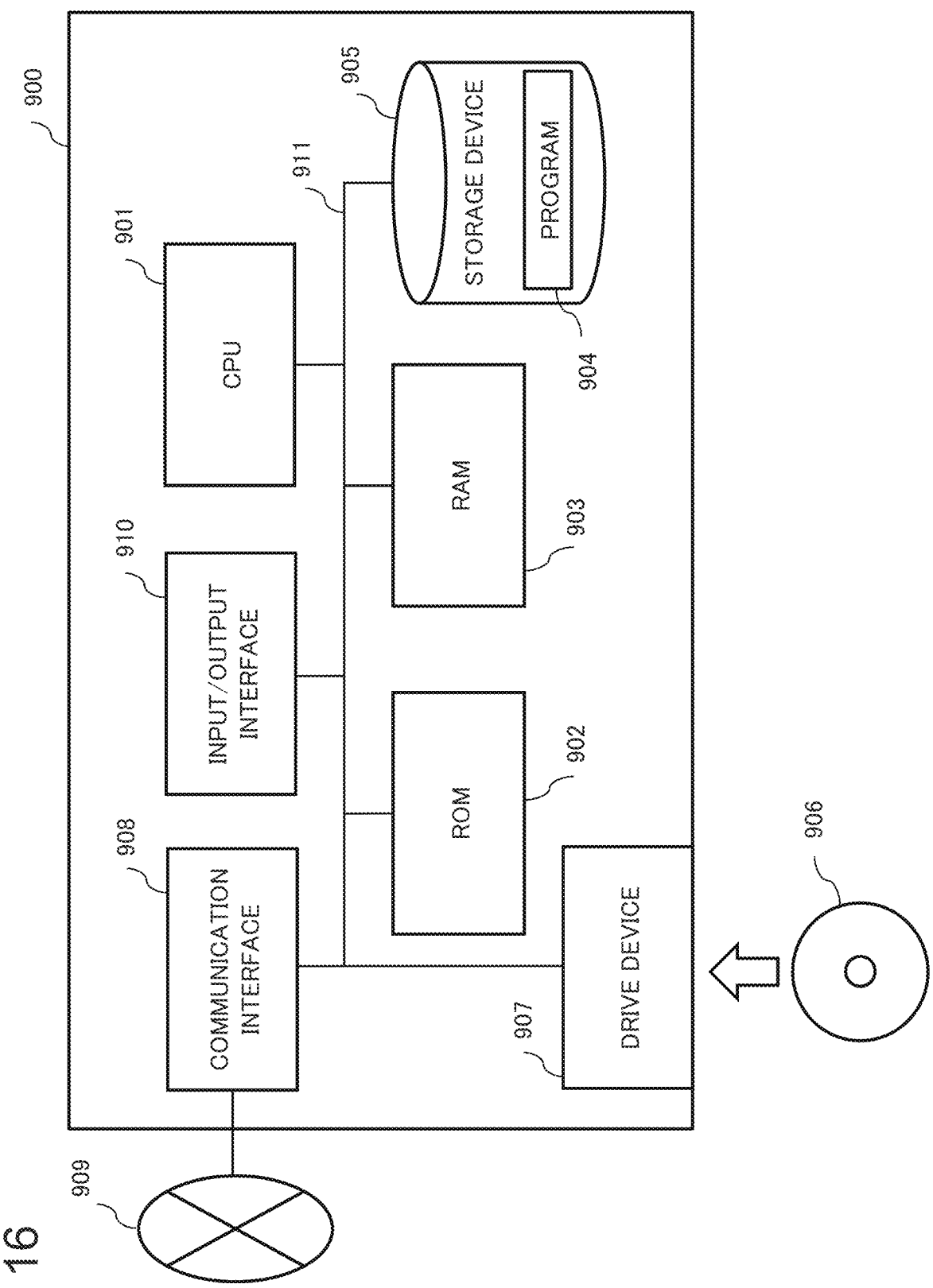
FIG. 16 is a diagram illustrating a hardware configuration of an information processing apparatus according to a fourth example embodiment.

In each example embodiment of the present disclosure, each component of each device indicates a block of functional units. Some or all of the components of each device are achieved, for example, by any combination of an information processing apparatus 900 illustrated in FIG. 16 and a program. FIG. 16 is a block diagram illustrating an example of a hardware configuration of the information processing apparatus 900 that achieves each component of each device.

As illustrated in FIG. 16, the information processing apparatus 900 includes the following configurations as an example.

Central Processing Unit (CPU) 901
Read Only Memory (ROM) 902
Random Access Memory (RAM) 903
Program 904 loaded into RAM 903
Storage device 905 that stores program 904
Drive device 907 that reads/writes from/to recording medium 906
Communication interface 908 that connects to communication network 909
Input/output interface 910 that inputs/outputs data
Bus 911 that connects components Each component of each device in each example embodiment is achieved by acquiring and executing the program 904, which achieves these functions, by the CPU 901. The program 904 that achieves the function of each component of each device is stored, for example, in the storage device 905 or the ROM 902 in advance, and the CPU 901 loads the program 904 into the RAM 903 and executes the program 904 as needed. The program 904 may be supplied to the CPU 901 via the communication network 909, or the program 904 may be stored in the recording medium 906 in advance and the drive device 907 may read the program and supply the read program to the CPU 901.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST

4 data processor
4a data processor
4b leakage inspection device
12 histogram function calculation unit
13 measurement time determination unit
14 vibration measurement unit
15 cross-correlation function calculation unit
16 integration time determination unit
17 peak detection unit
19 leakage determination unit
20 display unit
21 determination accuracy rate function calculation unit
22 measurement time determination unit
23 inspection efficiency function calculation unit
24 economic efficiency function calculation unit
100 leakage inspection system

The invention claimed is:

1. A leakage inspection device comprising:
at least one memory storing a set of instructions; and
at least one processor configured to execute the set of instructions to:
determine a measurement time;
measure vibration waveforms for the measurement time by using at least two sensors set to a pipe;
calculate a cross-correlation function of the measured vibration waveforms;
detect peaks of the cross-correlation function at least twice in the measurement time; and
determine that leakage occurs in a case where the peaks are repeatedly detected in the measurement time,
wherein
the at least one processor is further configured to execute the set of instructions to:
calculate a histogram function indicating a relationship between a water use time at one time and a frequency from information indicating the water use time; and
determine, as the measurement time, a time period in which a probability representing a probability that a sound source is a disturbance caused by use of water is equal to or less than a predetermined value determined in advance based on the histogram function.

2. The leakage inspection device according to claim 1, wherein
the at least one processor is further configured to execute the set of instructions to:
determine whether the peaks are repeated in the measurement time based on a detection result of the peaks;
in a case where the peaks are determined to be repeated in the measurement time, determine that a sound source of the vibration waveform is leakage; and
in a case where the peaks are not determined to be repeated in the measurement time, determine that the sound source of the vibration waveform is not leakage.

3. The leakage inspection device according to claim 1, wherein
the at least one processor is further configured to execute the set of instructions to:
determine an integration time in which values of the cross-correlation function of the vibration waveform are accumulated based on a S/N ratio of the vibration waveform; and
detect a peak of the cross-correlation functions integrated for the integration time.

4. The leakage inspection device according to claim 1, wherein
the at least one processor is further configured to execute the set of instructions to:
calculate a determination accuracy rate function indicating a relationship between a probability of correct determination of a type of the sound source of the vibration waveform and a time by using statistical data of a water use time;
calculate an inspection efficiency function indicating a relationship between an efficiency of a leakage inspection and a time by using information regarding an inspection plan;
calculate an economic efficiency function indicating an economic efficiency of a leakage inspection with respect to a time from the determination accuracy rate function and the leakage inspection efficiency function; and
determine, based on the economic efficiency function, the measurement time in such a way that the economic efficiency of the leakage inspection is maximized.

5. A leakage inspection method comprising:
determining a measurement time;
measuring vibration waveforms for the measurement time by using at least two sensors set to a pipe;
calculating a cross-correlation function of the measured vibration waveforms;
detecting peaks of the cross-correlation function equal to or more than twice in the measurement time; and determining that leakage occurs in a case where the peaks are repeatedly detected in the measurement time, wherein the method further comprises:

calculating a histogram function indicating a relationship between a water use time at one time and a frequency from information indicating the water use time; and determining, as the measurement time, a time period in which a probability representing a probability that a sound source is a disturbance caused by use of water is equal to or less than a predetermined value determined in advance based on the histogram function.

6. A non-transitory computer-readable storage medium that stores a program for causing a computer to execute processing comprising:

determining a measurement time;

measuring vibration waveforms for the measurement time by using at least two sensors set to a pipe;

calculating a cross-correlation function of the measured vibration waveforms;

detecting peaks of the cross-correlation function equal to or more than twice in the measurement time; and determining that leakage occurs in a case where the peaks are repeatedly detected in the measurement time, wherein the processing further comprises:

calculating a histogram function indicating a relationship between a water use time at one time and a frequency from information indicating the water use time; and determining, as the measurement time, a time period in which a probability representing a probability that a sound source is a disturbance caused by use of water is equal to or less than a predetermined value determined in advance based on the histogram function.

\* \* \* \* \*